United States Patent [19]

Kelly

[11] Patent Number: 4,757,795
[45] Date of Patent: Jul. 19, 1988

[54] METHOD AND APPARATUS FOR REGULATING FUEL INJECTION TIMING AND QUANTITY

[75] Inventor: William W. Kelly, Granby, Conn.

[73] Assignee: Stanadyne, Inc., Windsor, Conn.

[21] Appl. No.: 854,047

[22] Filed: Apr. 21, 1986

[51] Int. Cl.⁴ .............................................. F02M 39/00
[52] U.S. Cl. ................................ 123/506; 123/501; 123/458
[58] Field of Search ............... 123/506, 458, 450, 500, 123/501, 446; 417/462, 218

[56] References Cited

U.S. PATENT DOCUMENTS

| | | | |
|---|---|---|---|
| 4,395,987 | 8/1983 | Kobayashi | 123/506 |
| 4,445,484 | 5/1984 | Marion | 123/506 |
| 4,453,896 | 6/1984 | Vilardo | 417/462 |
| 4,459,963 | 7/1984 | Gross | 123/506 |
| 4,462,361 | 7/1984 | Karle | 123/357 |
| 4,475,507 | 10/1984 | Miyafi | 123/357 |
| 4,476,837 | 10/1984 | Salzgeber | 123/502 |
| 4,492,200 | 1/1985 | Takahaski | 123/450 |
| 4,503,820 | 3/1985 | Nakagawa | 123/357 |
| 4,505,240 | 3/1985 | Shinoda | 123/357 |
| 4,538,580 | 9/1985 | Straubel | 123/450 |
| 4,546,749 | 10/1985 | Igashira | 123/458 |
| 4,566,417 | 1/1986 | Suzuki | 123/478 |
| 4,574,756 | 3/1986 | Ito | 123/357 |
| 4,779,225 | 12/1973 | Watson | 123/458 |

Primary Examiner—Carl Stuart Miller
Attorney, Agent, or Firm—Chilton, Alix & Van Kirk

[57] ABSTRACT

An internal combustion engine fuel injection system having a reciprocating charge pump and a bidirectional flow, solenoid valve for precisely regulating the fuel injection timing by precisely reglating the intake charge quantity of fuel supplied to the charge pump during each intake stroke and for precisely regulating the fuel injection quantity by precisely regulating the spill termination of the high pressure delivery of fuel during each pumping stroke. An electrical controller having a data processor timely energizes and deenergizes the solenoid valve and adjusts the charge pump stroke timing, if adjustable, for adjusting the fuel injection timing and quantity. A start-of-pumping sensor or charge pump stroke timing sensor is used to provide a closed loop feedback, or in the alternative where the charge pump stroke is not adjustable, a calibrated input is used in lieu of a charge pump stroke timing sensor.

34 Claims, 9 Drawing Sheets

METHOD AND APPARATUS FOR REGULATING FUEL INJECTION TIMING AND QUANTITY

The present invention relates generally to internal combustion engine fuel injection systems of the type having a reciprocating charge pump for periodically delivering charges of liquid fuel under high pressure for fuel injection and relates more particularly to a new and improved method and apparatus for regulating the fuel injection timing and quantity.

It is a primary aim of the present invention to provide in a fuel injection system of the type described, a new and improved method and apparatus for closed loop electrical regulation of the fuel injection timing and quantity. The new and improved method and apparatus may be used in different fuel injection systems of the type described including those systems employing a unit injector at each cylinder of the engine and those systems employing a multiple cylinder fuel injection pump for periodically delivering charges of fuel under pressure sequentially to two or more cylinders.

It is another aim of the present invention to provide in a fuel injection system of the type described, a new and improved method and apparatus for regulating the fuel injection timing and quantity by regulating the opening and closure timing of a single, bidirectional flow, fuel valve and additionally, if desired, by regulating the charge pump stroke timing. In accordance with a preferred embodiment of the present invention, the fuel injection timing and quantity are regulated with an electrical controller having a data processor which precisely energizes and deenergizes a single bidirectional flow, electromagnetic valve and precisely adjusts the charge pump stroke timing, if adjustable.

It is a further aim of the present invention to provide in a fuel injection system of the type described, a new and improved method and apparatus for regulating the fuel injection timing and quantity by regulating both the quantity of fuel delivered to the charge pump and the timing of spill termination of fuel injection and additionally, if desired, by regulating the charge pump stroke timing.

It is a further aim of the present invention to provide in a fuel injection system of the type described, a new and improved electrical regulation method and apparatus employing a single timing sensor as a closed loop feedback for assuring precise regulation of (a) fuel injection timing, (b) fuel injection quantity and (c) charge pump stroke timing, if adjustable. In one preferred embodiment of the present invention, precise fuel injection timing and quantity and charge pump stroke timing, if adjustable, are assured by employing the feedback of a start-of-pumping (SOP) timing sensor. In another preferred embodiment, precise regulation is assured by employing the feedback of a charge pump stroke timing sensor. In a further preferred embodiment in which the charge pump stroke timing is fixed, a stroke timing reference value (calibrated) is employed in lieu of a timing sensor.

It is another aim of the present invention to provide in a fuel injection system of the type described, a new and improved method and apparatus for full authority electrical regulation of the fuel injection timing and quantity in accordance with any desired engine operation parameters such as engine speed, engine temperature, load demand and engine altitude or intake manifold pressure.

It is a further aim of the present invention to provide a new and improved electrical system for regulating the fuel injection timing and quantity which is reliable in operation, economical to manufacture and useful in a variety of different fuel injection systems of the type described.

It is another aim of the present invention to provide in a fuel injection system of the type described, a new and improved fuel injection pump having a small dead volume and useful in providing a very high fuel injection pressure of up to 12,000 psi or more, for example to provide direct fuel injection in a diesel engine application.

Other objects will be in part obvious and in part pointed out more in detail hereinafter.

A better understanding of the invention will be obtained from the following detailed description and accompanying drawings showing diagrammatic and preferred embodiments of the invention.

DESCRIPTION OF DIAGRAMMATICALLY ILLUSTRATED AND PREFERRED EMBODIMENTS

Figure 1:
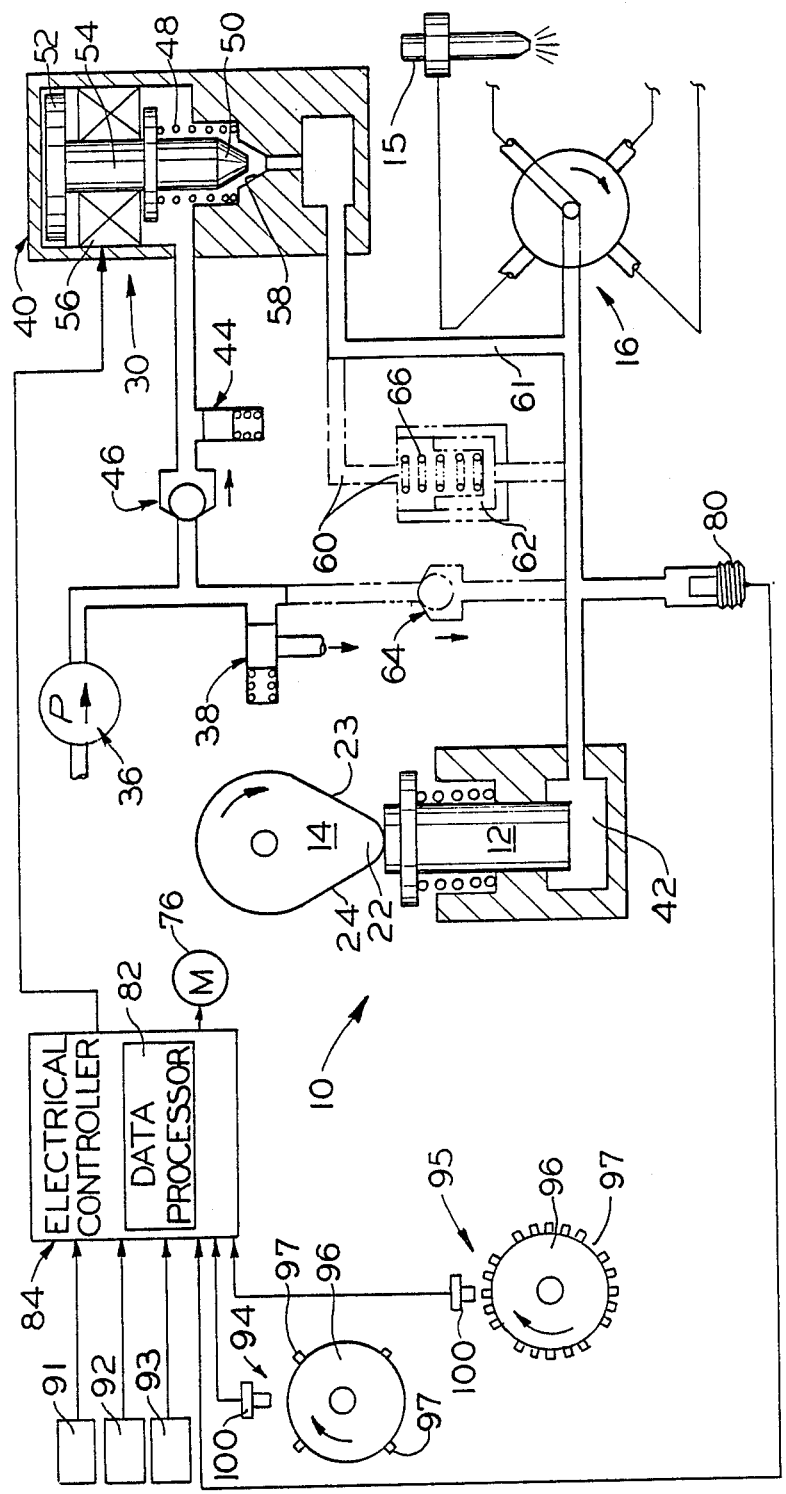
FIG. 1 is a diagrammatic illustration, partly broken away and partly in section, of a fuel injection system incorporating an embodiment of the present invention, additionally showing, partly in broken lines, a modification of the fuel injection system.

Referring to the drawings in detail wherein the same numerals are used to identify the same or like functioning parts, and referring particularly to FIG. 1, the present invention has notable utility with a fuel injection system 8 of the type having a reciprocating, positive displacement, charge pump for periodically delivering liquid fuel above a certain high pressure to one or more fuel injection nozzles 15 for injection of fuel for combustion. The fuel injection system 8 also has a suitable distributor 16 where the charge pump 10 is employed to deliver fuel sequentially to two or more nozzles 15.

For example, the charge pump 10 may be a rotating cam, charge pump of the type disclosed in U.S. Pat. No. 4,462,361, dated July 31, 1984, and entitled "Apparatus For Generating A Fuel Quantity Signal", or a rotating cam, charge pump of the type disclosed in U.S. Pat. No. 4,475,507, dated Oct. 9, 1984, and entitled "Fuel Injection Amount Control", or a non-rotating cam, charge pump of the type disclosed in U.S. Pat. No. 4,476,837, dated Oct. 16, 1984, and entitled "Method And System For Fuel Injection Timing". Accordingly, although preferred embodiments of the present invention, described hereinafter, are embodied in fuel injection systems having in one case a non-rotating operating cam and in another case a unit injector, it will be appreciated that the present invention can also be embodied in other types of fuel injection systems.

Figure 2:
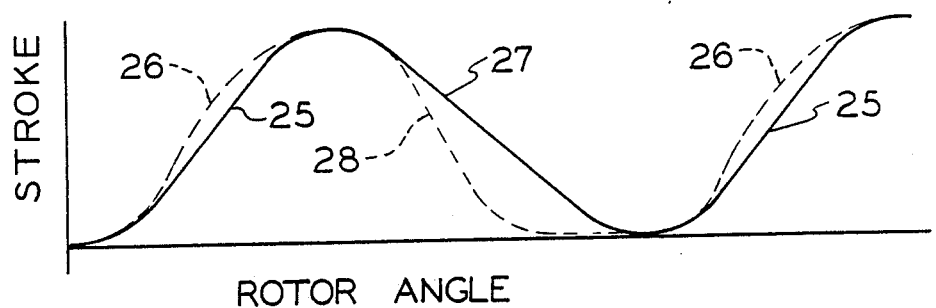
FIG. 2 is a graph representation of the stroke profile of a reciprocating charge pump of the fuel injection system, showing different stroke profiles in full and broken lines.

Referring to FIGS. 1 and 2, the illustrated charge pump 10 comprises a pumping plunger 12 and an operating cam 14 for reciprocating the plunger 12. The cam 14 has a cam lobe 22 with an intake ramp 23 and a pumping ramp 24. The slope of the pumping ramp 24 in combination with the operating variables and characteristics of the system, including the operating characteristics of the injection nozzle 15, determine the time/pressure profile of the fuel injection event. The effective slope of the pumping ramp 24 can be made constant along the length of the ramp 24 (i.e. to produce a constant plunger velocity at each pump speed) as represented by the straight full line pumping slope 25 shown in FIG. 2 so that the time/pressure profile of the fuel injection event is not dependent on the ramp segment which is active during the fuel injection event. Also, the pumping slope can be varied along the length of the ramp as represented by the convex, broken line pumping slope 26 shown in FIG. 2, so that the time/pressure profile is dependent on the active pumping ramp segment.

Either a stroke-time or pressure-time fuel metering process is employed for regulating the fuel quantity delivered to the charge pump during its intake stroke. Where a stroke-time metering process is employed, the intake ramp 23 has a relatively gradual intake slope 27 which ensures that positive fuel pressure is maintained in the pumping chamber 42 of the charge pump 10 during an initial charging phase of the intake stroke. For that reason, the intake ramp 23 is contoured to provide a relatively gradual intake slope, shown by a full line in FIG. 2, which is substantially less than the relatively steep pumping slope. Where a pressure-time metering process is employed, the intake ramp 23 is contoured to provide a relatively steep intake slope 28 as shown by a broken line in FIG. 2.

An electromagnetically operated, bidirectional flow, control valve 30 (either alone or in conjunction with an auxiliary valve 32 described with reference to FIG. 7) is employed to meter fuel to the charge pump 10 during an initial charging phase of its intake stroke and to spill terminate the fuel injection event during the pumping stroke. A supply pump 36 is provided for supplying fuel at a relatively low pressure which increases with pump speed (e.g. from 30 to 100 psi) established by a suitable pressure regulator 38. Fuel at supply pressure is precisely metered to the charge pump 10 during its intake stroke by precisely regulating the closure timing of the control valve 30. Where a stroke-time inlet metering process is employed, the supply pressure is sufficient to completely fill the charge pump 10 during the initial charging phase of the intake stroke during which the control valve 30 is open. Where a pressure-time inlet metering process is employed, the charge pump 10 is partly filled during the initial charging phase with a quantity of fuel regulated by the pressure-time inlet metering process. A valve solenoid 40 is energized to close the valve 30 during the intake stroke. Because of the relatively low supply pressure, the intake quantity can be precisely metered by precise energization of the solenoid 40.

The control valve 30 remains energized (closed) during the remainder of the intake stroke and during the succeeding initial phase of the pumping stroke, during which initial phase the vapor or cavitation space in the pumping chamber 42 is first eliminated and then a charge of fuel is delivered above a certain high pressure for fuel injection. The solenoid 40 is deenergized before the end of the pumping stroke to open the control valve 30 and spill the excess quantity of fuel and thereby terminate fuel injection. During the continuing pumping stroke after the control valve 30 is opened, fuel is exhausted or spilled from the charge pump 10 via the open valve 30 to an accumulator 44 located betweeen the control valve 30 and a one-way ball check valve 46. Thus, the quantity of fuel metered to the charge pump 10 during the initial charging phase of the intake stroke is always greater than the quantity of fuel delivered under pressure by the charge pump 10 for fuel injection.

The control valve 30 has a rapid response in the opening direction for highly responsive spill termination of fuel injection. For that reason, the valve 30 is electromagnetically closed and has a suitable coil compression spring 48 providing the necessary opening force (e.g. 5–10 pounds) which, in combination with the hydraulic opening force on the valve member 50, rapidly opens the valve 30 and provides the desired spill termination response when the solenoid 40 is deenergized. The control valve 30 has a quick but slower closure response due to the slower response of the valve electromagnet. When the solenoid 40 is energized, an enlarged soft iron head 52 of a solenoid armature 54 is retracted toward the upper adjacent end face of the solenoid stator 56. The solenoid armature 54 is thereby shifted axially against the bias of the valve opening spring 48. The solenoid armature 54 has an inner conical end 50 providing an integral valve member which engages a conforming conical counterbore or valve seat 58 to close the valve 30.

During the remainder of the charge pump intake stroke after the control valve 30 is closed, the fuel pressure within the pumping chamber 42 decreases to the point where fuel vaporization or cavitation occurs, the degree of which depends on the pump speed and the type of charge pump 10 employed. Such fuel vaporization or cavitation can cause undesirable pressure waves during the fuel injection event which adversely affect the time/pressure profile of the fuel injection event. Therefore, where such vaporization or cavitation is a problem, the pumping chamber 42 preferably is isolated from a separate cavitation chamber 60 by modifying the charge pump 10 as shown in part in broken lines in FIG. 1. In the modified version, instead of employing a direct line 61 from the control valve 30, an isolation shuttle or piston 62 is interposed between the control valve 30 and pumping chamber 42 and a one-way inlet check valve 64 is used to supply fuel to the pumping chamber 42. During the initial charging phase of the intake stroke when the control valve 30 is open, fuel is supplied via the control valve 30 only to the back of the isolation shuttle 62. The isolation shuttle 62 has a strong return spring 66 which produces a pressure in the pumping chamber 42 greater than the pressure supplied to the inlet side of the one-way inlet check valve 64. Accordingly, while the control valve 30 is open and even after the valve 30 is closed, the one-way check valve 64 remains closed and the isolation shuttle 62 supplies fuel under pressure to the pumping chamber 42 until the shuttle 62 reaches its extended limit position shown in FIG. 1. Thereafter, fuel is supplied under low pressure to the pumping chamber 42 via the one-way check valve 64 to fill the pumping chamber 42 and eliminate any fuel vaporization or cavitation in the pumping chamber 42. After the control valve 30 is closed and during the continuing displacement of the isolation shuttle 62 by its return spring 66, fuel vaporization or cavitation will occur in the fuel cavitation chamber 60 between the isolation shuttle 62 and the closed control valve 30. (Also, fuel vaporization or cavitation will occur in the fuel cavitation chamber 60 before valve closure where a pressure-time metering process is employed. During the subsequent pumping stroke of the charge pump, the isolation shuttle 62 is hydraulically retracted against the bias of its return spring 66 by fuel delivered from the pumping chamber 42 until the vapor or cavitation space in the cavitation chamber 60 is eliminated. The charge pump pressure then increases above a certain high pressure to open the fuel injection nozzle 15. Thus, in the modified system, the control valve 30 regulates the quantity of fuel supplied to the charge pump 10 during its intake stroke by regulating the quantity of fuel supplied to the cavitation chamber 60 at the back of the isolation shuttle 62.

Figure 3:
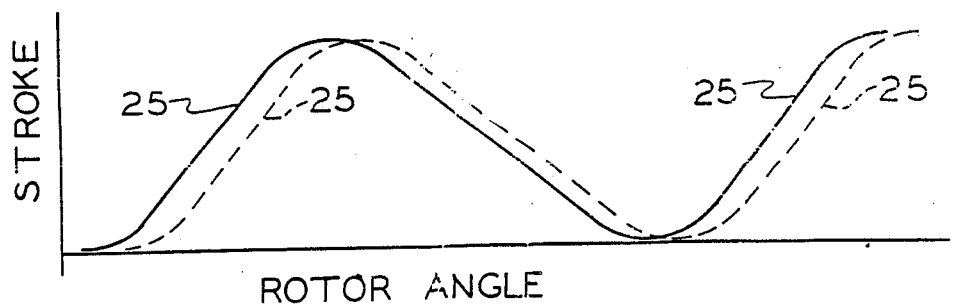
FIG. 3 is a graph representation similar to FIG. 2 showing the stroke profile in full and broken lines at two different stroke timing settings.
Figure 5:
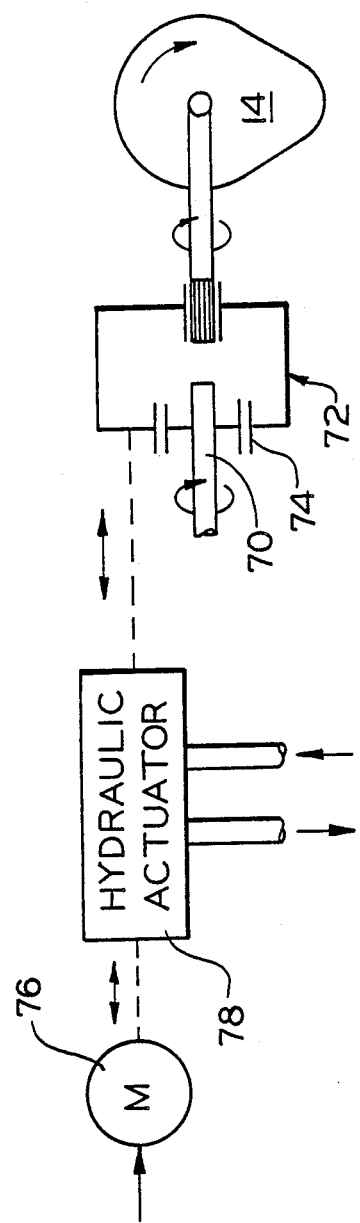
FIG. 5 is a diagrammatic illustration, partly broken away, showing a stroke timing adjustment mechanism of the charge pump.

The charge pump stroke timing can be made adjustable, for example as diagrammatically illustrated in FIG. 5. There, the charge pump stroke timing is adjusted by angular adjustment of the operating cam 14 relative to the its drive shaft 70 by axially adjusting a sleeve 72 having an internal helical spline 74 which couples the cam 14 to its drive shaft 70. The sleeve 72 is axially positioned by a bidirectional stepper motor 76 via a suitable hydraulic actuator 78, for example as disclosed in the aforementioned U.S. Pat. No. 4,476,837. Adjustment of the charge pump stroke timing is graphically illustrated in FIG. 3 and permits the length of the pumping ramp to be reduced and/or the active segment of the pumping ramp 24 to be selected.

Figure 4:
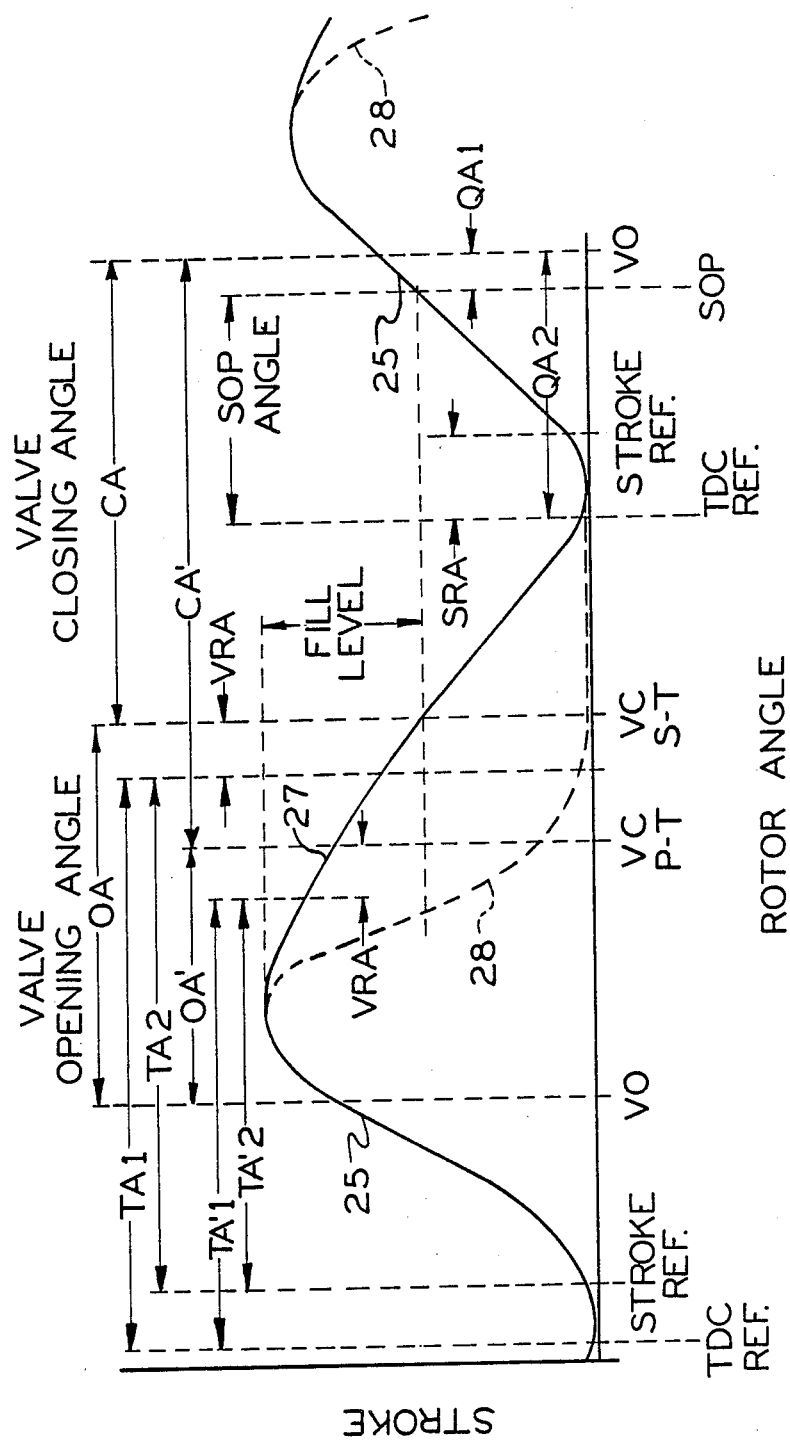
FIG. 4 is a graph representation similar to FIGS. 2 and 3, additionally showing the start-of-pumping (SOP) timing, stroke reference timing, valve opening and closure timing, valve closure response and engine top-dead-center (TDC) reference timing of a representative operating cycle of the fuel injection system.

Referring to FIG. 4, the valve closure timing ($VC_{S-T}$) and start-of-pumping (SOP) timing occur essentially at the same level on the intake and pumping ramps 23, 24 of the charge pump operating cam 14 where a stroke-time inlet metering process is employed. Where a pressure-time inlet metering process is employed, the SOP timing and valve closure timing ($VC_{P-T}$) have a predetermined (calibrated) relationship. Actual fuel injection timing (i.e. commencement of the fuel injection event) occurs slightly later than SOP timing primarily due to the compression of fuel at the high fuel injection pressure. Thus, both SOP timing and actual fuel injection timing are a function of (a) charge pump stroke timing and (b) solenoid valve closure timing (or quantity of fuel metered to the charge pump during its intake stroke). For any given charge pump stroke timing, or if the charge pump stroke timing is fixed, the SOP or fuel injection timing is precisely regulated solely by precisely regulating the solenoid valve closure timing. If the charge pump stroke timing is fixed, the pumping ramp 24 preferably has a constant effective slope made sufficiently long to accommodate the desired range of injection timing. For example, a fixed cam would have a pumping ramp 24 of 18 degrees to provide a timing adjustment range of 10 degrees and a remaining maximum pumping segment of 8 degrees for injecting a maximum fuel quantity of 100 mm$^3$.

Preferably, a suitable SOP timing sensor 80 or other fuel injection timing sensor for generating a reference timing signal of the actual fuel injection timing is provided for generating a closed loop feedback for determining, with a data processor 82 of an electrical controller 84, the actual SOP timing and/or the actual fuel injection timing. In the shown embodiment, an SOP timing sensor 80 is provided at the charge pump 10 for generating an SOP timing signal when the pumping pressure reaches a predetermined level (e.g. 1000 psi). Another type of fuel injection timing sensor, such as a nozzle valve lift sensor (not shown), may be used in place of or in addition to the SOP timing sensor 80.

The actual charge pump stroke timing is determined by the data processor 82 (irrespective of whether the charge pump stroke timing is fixed or adjustable) from the valve closure timing $VC_{S-T}$ or $VC_{P-T}$ and the timing signals generated by the timing sensor 80. Charge pump stroke timing can be determined in that manner because, as illustrated in FIG. 4, there is only one cam position (i.e. charge pump stroke timing) for any given valve closure timing and succeeding SOP timing. Thus, by virtue of the closed-loop feedback provided by the timing sensor 80, a variable rate pumping ramp 24 can be employed and the charge pump stroke timing can be adjusted to use any pumping rate provided by the ramp 24. For example, the steepest segment of the pumping ramp 24 is used at low RPM (i.e. during starting and at idle) to provide a fuel injection event with the desired time/pressure profile.

Processor determination of actual valve closure timing from the timing of control valve energization is acceptable in many configurations (notwithstanding the valve closure interval) where a small variation in valve closure timing would not cause a significant variation in the inlet metered quantity of fuel. Where greater accuracy is needed for determining valve closure and/or valve opening timing, a superimposed voltage signal, induced by a change in the velocity of the valve armature 54 and generated when the valve 30 opens and closes, is employed to more exactly determine the valve closure and/or opening timing.

The data processor 82 provides for precisely energizing and deenergizing the solenoid valve 30 and for precisely regulating the charge pump stroke timing where charge pump stroke timing adjustment is provided. Suitable engine sensors 91–95 are employed to transmit the desired engine data to the electrical controller. Suitable fixed data in the form of tables and algorithms are stored in the data processor 82 for operating the control valve 82 and adjusting the charge pump stroke timing, where adjustable, in accordance with the engine data. The fixed data, including stroke profile data and injection system installation and calibration data, enable the data processor 82 to determine from the engine data, (a) the desired valve closure timing to achieve the desired fuel injection timing, (b) the desired charge pump stroke timing, where adjustable, to use the desired active segment of the pumping ramp 24 and (c) the desired valve opening timing for injecting the desired quantity of fuel. The engine sensors 91-95 include for example (a) a crankshaft reference position sensor 94 for determining the TDC timing of each engine cylinder, (b) a coolant temperature sensor 91, (c) an altitude or intake manifold pressure sensor 92 and (d) a load demand sensor 93 (e.g. operated by an accelerator pedal in a vehicle application). The crankshaft reference position sensor 94 is shown having a trigger wheel 96 with four equiangularly spaced TDC trigger elements or teeth 97 as typically used with an eight cylinder engine. The periodic TDC reference signals generated by the crankshaft reference position sensor 94 can also be used by the electrical controller to calculate engine speed. However, a high resolution sensor 95, for example having a trigger wheel 96 with 120 equiangularly spaced trigger elements or teeth 97, preferably is used to calculate instantaneous engine speed with greater accuracy. Also, the high resolution sensor 95 can be used for determining the TDC and/or stroke reference timing (depending on whether the stroke timing is adjustable, and if adjustable whether the sensor timing is adjusted with the stroke timing) with the data processor 82 by employing a tooth gap instead of a tooth for each TDC reference point as shown diagrammatically in FIG. 1. As shown diagrammatically in FIG. 4, each TDC reference point preferably is located before the corresponding stroke reference point and both reference points preferably are located approximately at the end of the intake stroke or beginning of the pumping stroke.

The sensor 95 is also employed to measure the angle of rotation of the charge pump 10 for measuring the actual timing and quantity angles TA and QA (FIG. 4) for timing the energization and de-energization of the control valve 30. Each pulse increment of the sensor 95 is electronically divided into smaller angular increments for greater measurement accuracy.

As indicated, the SOP timing sensor 80 completes a control loop for processor determination of (a) actual SOP timing and actual fuel injection timing, (b) actual charge pump stroke timing and (c) active pumping ramp segment. Based on such determinations, the electrical controller 84 adjusts the control valve 30 closure timing and the charge pump stroke timing, where adjustable, to achieve the desired values. The quantity of injected fuel is precisely regulated by deenergizing the solenoid valve 30 at the end of an energization period precisely determined by the processor 82. That period is determined from the actual fuel injection timing and the contour of the active pumping cam segment. Thus, closed loop control of the fuel injection quantity is also provided by the single timing sensor 80.

Figure 6:
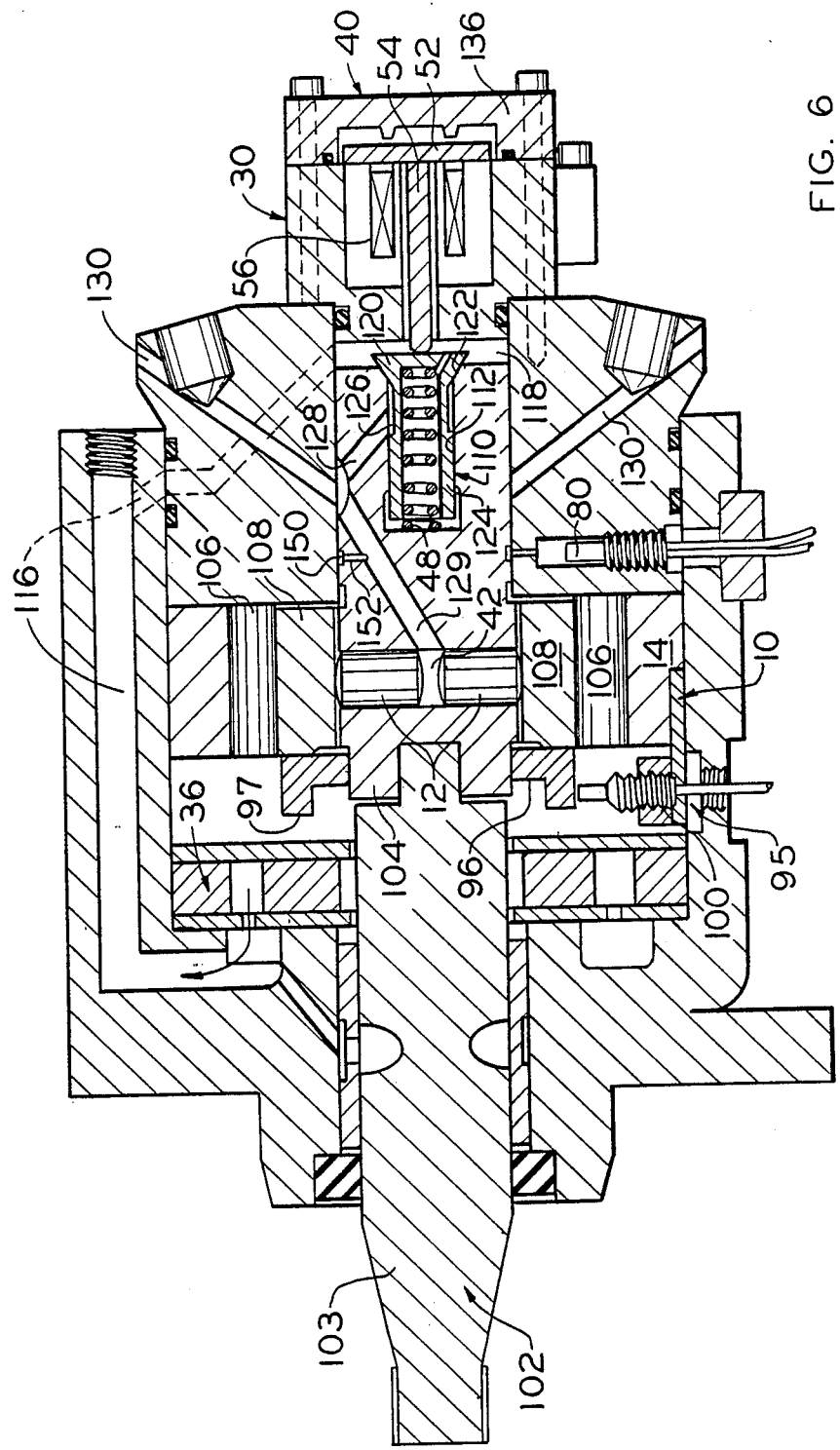
FIG. 6 is a longitudinal section view, partly broken away and partly in section, of a fuel injection pump according to a preferred embodiment of the present invention.

Referring to FIG. 4, any two of the three timing reference points (SOP or other fuel injection reference timing, valve closure timing and charge pump stroke timing) can be used to calculate the third reference point. Thus, as indicated, charge pump stroke timing can be determined by the data processor from valve closure timing and SOP timing (or other fuel injection reference timing). Also, SOP timing (or other fuel injection reference timing) can be determined by the data processor from valve closure timing and charge pump stroke timing. Or, valve closure timing can be determined from SOP timing (or other fuel injection reference timing) and charge pump stroke timing. Where a non-rotating charge pump operating cam 14 is used (as in the embodiment shown in FIG. 6), the sensor pickup 100 of the high resolution sensor 95 is mounted on the cam 14 (as shown in FIG. 6). If the operating cam 14 is not adjustable, a cam reference point value or offset can be entered into the data processor 82 as a fixed calibrated input, in lieu of providing a stroke timing sensor. In that event, the SOP timing (or other fuel injection reference timing) can be determined by the data processor from only the valve closure timing and that fixed calibrated input. Nonetheless, in those applications where an SOP or other fuel injection timing sensor can be employed to directly determine the actual fuel injection timing, such is preferred to verify that the desired fuel injection timing is achieved. The actual fuel injection timing can then be used in conjunction with the charge pump stroke timing to determine the fuel injection quantity.

The fuel injection timing is synchronized with the associated engine by the TDC reference singals generated by the TDC reference timing sensor 94.

The reciprocating charge pump 10 described with reference to FIGS. 1-5, 10 and 11 may for example be a non-rotating cam, charge pump of the type shown in FIGS. 6 and 7. That charge pump 10 may be generally like the charge pump disclosed in U.S. Pat. No. 4,476,837 except as otherwise described herein. Briefly, the charge pump 10 has a rotor 102 with a drive shaft 103 to couple the rotor 102 to be driven by a associated internal combustion engine. The charge pump 10 has a pair of pumping plungers 12 reciprocable in a diametral bore of a rotor body 104 for pumping fuel from a pumping chamber 42 formed between the pumping plungers 12. A pair of cam followers or rollers 106 and roller shoes 108 are mounted on the rotor body 104 in radial alignment with the plungers 12. An internal cam, non-rotating cam ring 14 encircling the rotor body 104 is engageable by the rollers 106 for periodically camming the plungers 12 inwardly together during rotation of the rotor 102. The cam ring 14 can be either fixed to provide fixed charge pump stroke timing or be angularly adjustable, in which case its angular position is adjusted by a hydraulic timing piston as described with reference to FIG. 5 and as disclosed in U.S. Pat. No. 4,476,837. Each of the four equiangularly spaced, identical camming lobes 22 of the cam ring 14 has a profile providing pumping and intake ramps 23, 24 as shown and described with reference to FIGS. 1-5.

A balanced poppet valve 110 is mounted within a coaxial bore 112 in the outer end of the rotor body 104. The fuel supply pump 36 is mounted on and driven by the pump drive shaft 103 at the other end of the fuel injection pump. The supply pump 36 supplies fuel via a suitable fuel passage 116 to an end chamber 118 at the outer end of the rotor body 104. The poppet valve 110 has a conical head 120 engageable with an inner edge of a conical valve seat 122 at the end of the valve mounting bore 112. The poppet valve stem 124 has a peripheral annulus 126 for connecting the end chamber 118 to the charge pump 10 when the poppet valve 110 is open. While the poppet valve 110 is open during each intake stroke of the charge pump 10, fuel is delivered under low pressure from the supply pump 36 via the poppet valve 110 and diagonal bores 128, 129 in the rotor body 104 to the pumping chamber 42. While the poppet valve 110 is closed during the pumping stroke of the charge pump 10, fuel is delivered under high pressure via a distributor passage provided by the diagonal bore 129. The distributor passage 129 registers sequentially with a plurality of equiangularly spaced outlet passages 130 (only two of which are shown in FIG. 6) for delivering high pressure charges of fuel sequentially to the fuel injection nozzles of the associated internal combustion engine. The high pressure dead volume of the rotor body 104 provided by the diagonal bores 128, 129 is held to a minimum to permit fuel injection up to 12,000 psi or higher.

A coil compression spring 48 is mounted within an axial bore in the poppet valve stem 124 to rapidly open the valve 110 when the valve operating solenoid 40 is deenergized. Fuel is then spilled from the charge pump 10 via the peripheral annulus 126 in the valve stem 124 and an annular, relatively large diameter valve opening provided betweeen the conical surfaces of the valve head 120 and valve seat 122. That valve passage provides for substantially unrestricted fuel flow for rapidly terminating the fuel injection event when the solenoid 40 is deenergized. A suitable fuel passage is provided through the valve head 120 to balance the valve.

A solenoid housing 136 is mounted on the outer end of the pump housing coaxially with the rotor body 104 and with its armature 54 coaxially aligned and in engagement with the outer end face of the poppet valve 110. The poppet valve 110 and armature 54 are thereby connected to shift axially together upon energization and deenergization of the solenoid 40. The armature 54 has a partly spherical inner end engaging the valve end face to permit relative rotation of the poppet valve 110 and armature. As described with reference to FIGS. 1-5, 10 and 11, the control valve 30 is precisely energized to precisely regulate the fuel injection timing and is precisely deenergized to precisely regulate the injected quantity of fuel.

Figure 7:
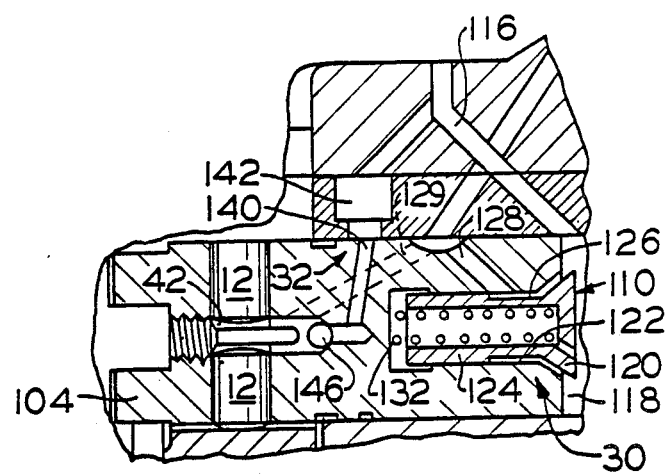
FIG. 7 is a partial longitudinal section view, partly broken away and partly in section. of a modified embodiment of the fuel injection pump of FIG. 6.

In a modification of the pump shown in FIG. 7, an auxiliary inlet valve 32 is provided for assisting the control valve 30 in supplying fuel to the charge pump 10 during the first part of the intake stroke charging phase. The shown auxiliary valve 32 has inlet porting like that employed in U.S. Pat. No. 4,476,837 in that the auxiliary valve 32 comprises a valve port 140 in the rotor body 104 which registers sequentially with a plurality of equiangularly spaced fuel supply ports 142 (only one of which is shown in FIG. 7). Fuel is thereby supplied via an inlet passage 144 and ball check valve 146 in the rotor body 104 to the pumping chamber 42. The supply ports 142 are located for supplying fuel to the pumping chamber 42 only during the first part of the inlet stroke charging phase and the rotating valve port 140 moves out of registry with each fixed supply port 142 before the valve closure timing phase is reached. Such an auxiliary fuel supply system is primarily useful at high speed (and therefore when the fuel injection timing is advanced) in a 6 or 8 cylinder engine application to ensure that the desired quantity of fuel is supplied to the charge pump during the short available interval. Thus, for example in an eight cylinder engine application in which the inlet fuel charge quantity ranges from 120 mm$^3$ to 200 mm$^3$, the auxiliary valve 32 closes on or before the 120 mm$^3$ point is reached and the control valve 30 precisely regulates the intake charge quantity within that range. Either a stroke-time or pressure-time metering process is employed with the control valve 30 after the auxiliary valve 32 closes. The ball check valve 146 is employed to reduce the dead volume within the rotor and to prevent fuel leakage at the valve port 140 during high pressure pumping and to permit the auxiliary valve 32 to open before the end of the prior fuel injection event.

Figure 8:
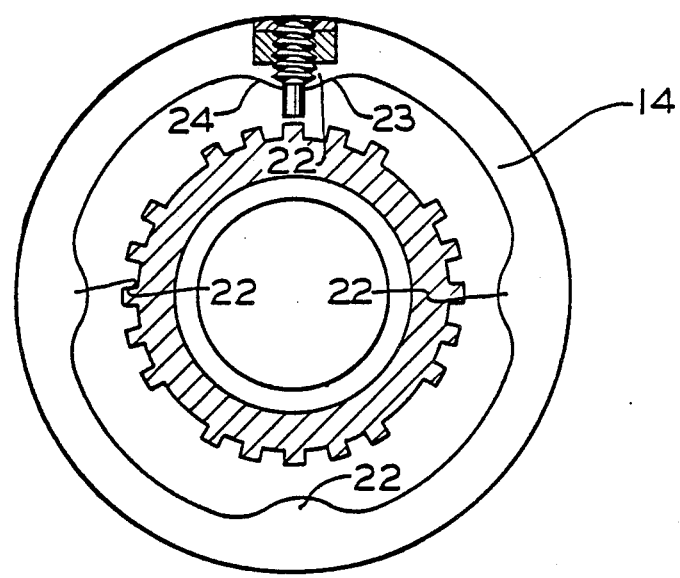
FIG. 8 is a transverse section view, partly broken away and partly in section, of the fuel injection pump of FIG. 6.

Referring to FIG. 6, a SOP sensor 80 is shown mounted in the pump housing for generating SOP signals. A shallow peripheral groove 150 and short radial bore 152 are provided in the rotor body 104 for connecting the SOP sensor 80 to the distributor passage 129. Referring to FIGS. 6 and 8, a stroke timing sensor 95 is also provided. The pickup 100 of the stroke timing sensor 95 is mounted on the operating cam 14 for cooperation with a trigger wheel 96 driven by the rotor body 104. As described with reference to FIG. 1, the high resolution trigger wheel 96 has a tooth gap for each charge pump stroke reference point. As described with reference to FIGS. 1-5, 10 and 11, either sensor 80, 95 is employed to provide a feedback signal for precise regulation of the control valve 30 and adjustment of the cam 14, if adjustable.

Figure 9:
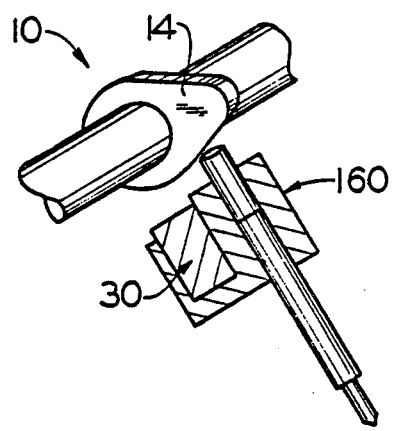
FIG. 9 is a partial view, partly broken away and partly in section, of a unit injector fuel injection system according to another preferred embodiment of the present invention.

Referring to FIG. 9, the reciprocating charge pump 10 described with reference to FIGS. 1-5, 10 and 11 may be a unit injector 160 having a suitable solenoid control valve 30. A stroke-time inlet metering process preferably is employed in a unit injector application since it provides very precise regulation of the fuel injection timing without measuring the valve closure response time. That is so because the inlet metering rate is relatively low and slight variations in valve closure timing do not significantly affect the inlet metered quantity. Thus, as described with reference to FIGS. 1-5, 10 and 11, the control valve 30 of the unit injector is precisely energized to precisely regulate the fuel injection timing and is precisely deenergized to precisely regulate the injected quantity of fuel.

Figure 10:
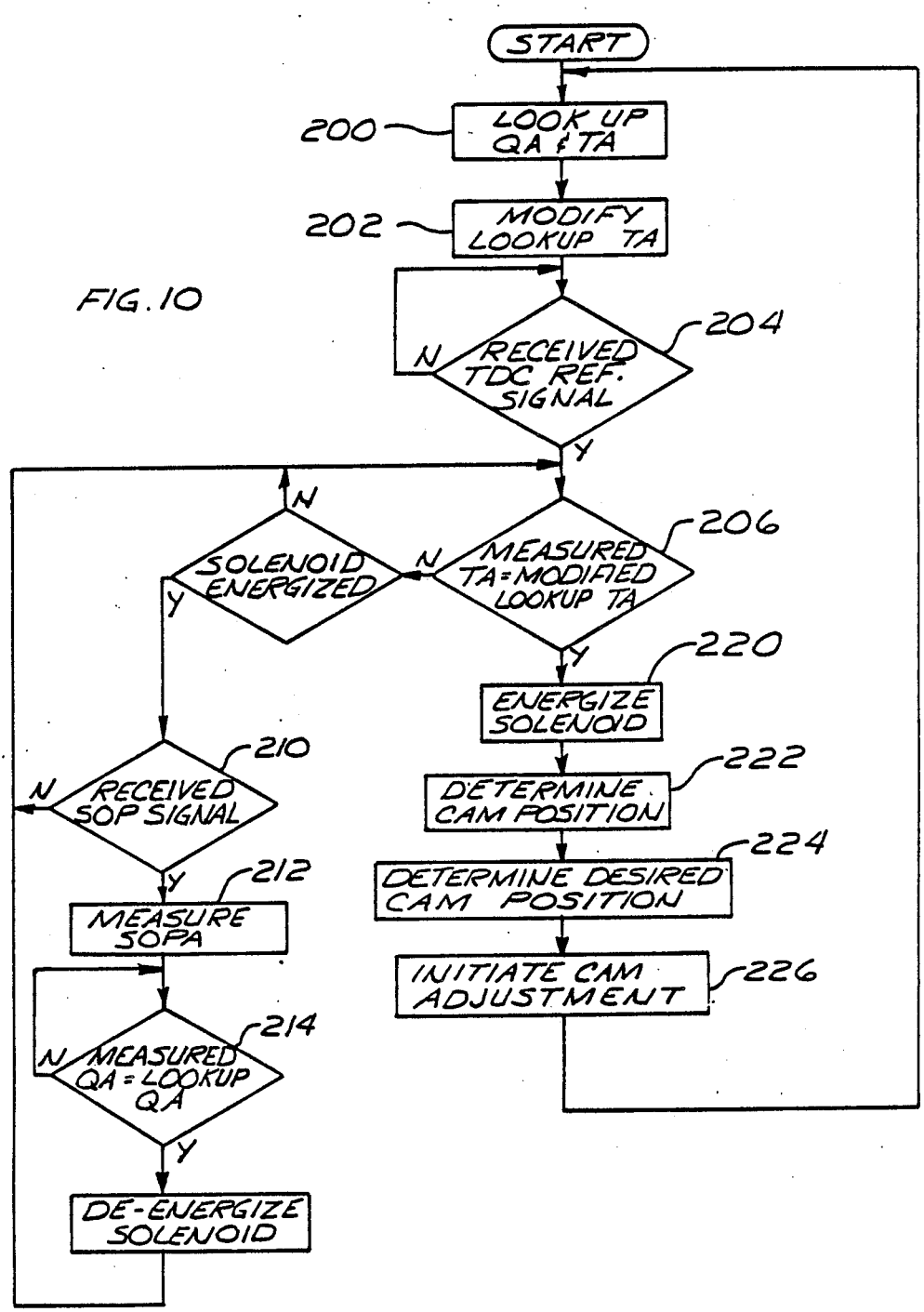
FIGS. 10 and 11 are flowcharts of representation sequences of steps performed by a data processor for regulating the fuel injection timing and quantity and charge pump stroke timing if adjustable, in accordance with the present invention.
Figure 11:
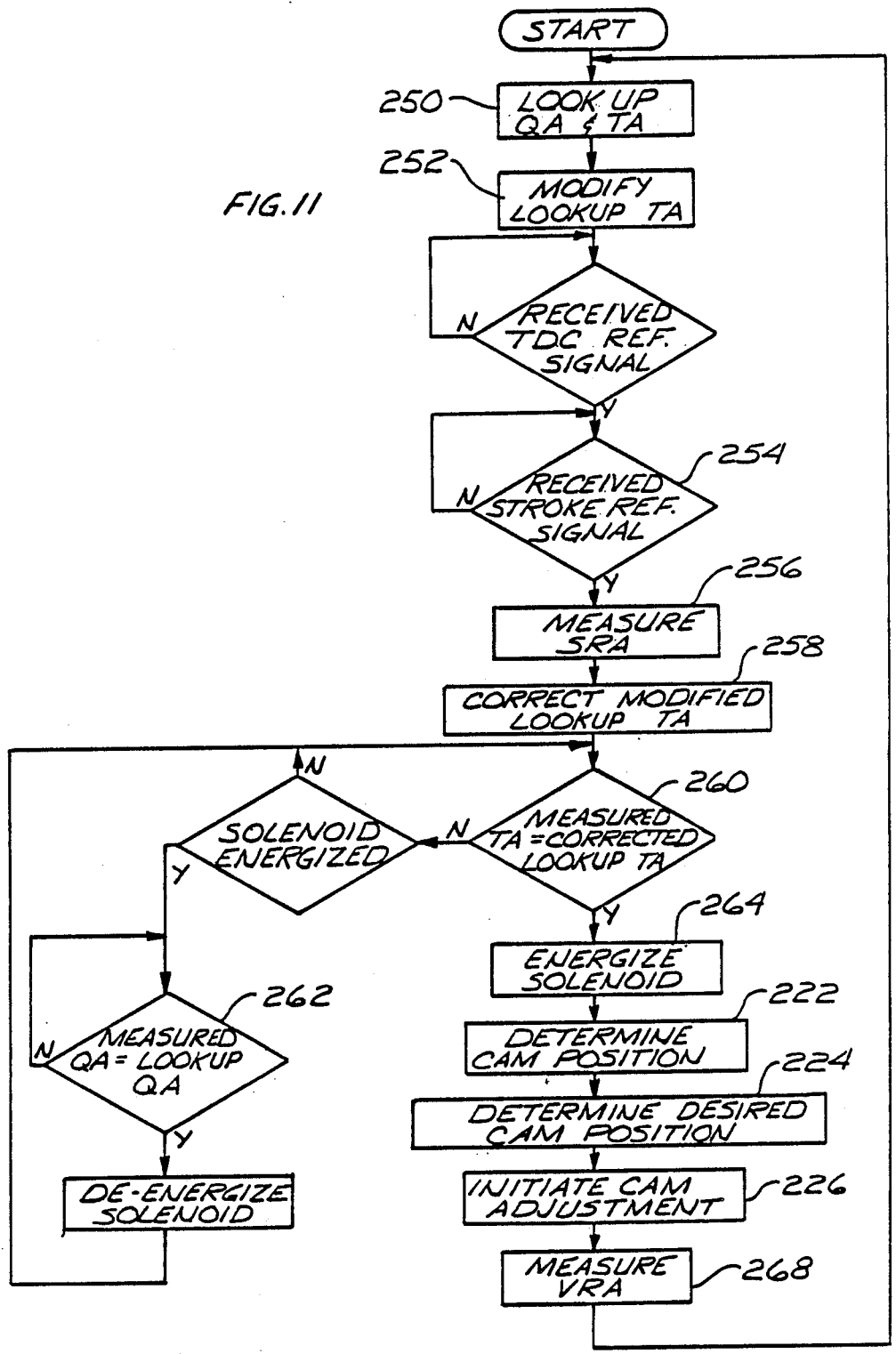

Exemplary flowcharts are shown in FIGS. 10 and 11 to illustrate how the processor 82 regulates the valve closure and opening timing and charge pump stroke timing where adjustable. FIG. 10 illustrates an exemplary sequence of steps performed by the processor 82 in a system employing an SOP sensor 80. Referring to FIGS. 4 and 10, the first step 200 is to lookup, in the tables stored in the processor 82, the desired fuel quantity angle QA (QA=QA1) and the desired timing angle TA (TA=TA1 or TA'1 depending on the type of inlet metering process employed) for the existing engine speed and current engine data provided by the sensors 91-93. In a succeeding adaptive step 202, the timing angle TA obtained from the lookup tables is modified to reflect the angle offset between the actual SOP angle SOPA (measured during the prior fuel injection cycle) and the predicted SOP angle SOPA on which the lookup timing angle TA is based. As shown by steps 204 and 206, when the TDC reference signal is generated, the actual timing angle TA is measured until it equals the modified lookup timing angle TA. During that measurement, the processor 82 checks for receipt of the SOP signal as represented by step 210. When the SOP signal is generated, the actual SOP angle SOPA is measured (for use in modifying the lookup timing angle TA in the succeeding cycle) as represented by step 212. Also, as represented by step 214, the actual quantity angle QA is measured and compared with the lookup quantity angle QA. When the measured quantity angle QA equals the lookup quantity angle QA, the solenoid valve 30 is de-energized to terminate the fuel injection event. Thereafter, as represented by steps 206 and 220, when the measured timing angle TA equals th modified lookup timing angle TA, the solenoid valve 30 is reenergized. As represented by steps 222, 224 and 226, if the timing cam 14 is adjustable, the processor 82 then calculates the actual and desired cam positions, and initiates cam adjustment to achieve the desired cam position. The maximum cam adjustment during each fuel injection cycle is very small and such that typically, the cam is continuously adjusted during many injection cycles to achieve the desired cam position.

FIG. 11 illustrates an exemplary sequence of steps performed by the processor 82 in a system having a stroke timing sensor 95 (FIGS. 6 and 8) or having fixed stroke timing and a fixed reference angle (calibrated) in lieu of a stroke timing sensor 95.

Referring to FIGS. 4 and 11, the first step 250 is to look up, in the tables stored in the processor 82, the desired fuel quantity angle QA (QA=QA2) and the desired timing angle TA (TA=TA2 or TA'2 depending on the type of inlet metering process employed) for the existing engine speed and current engine data provided by the engine sensors 91–93. In the succeeding adaptive step 252, the lookup timing angle TA is modified to reflect the angle offset between the actual valve response angle VRA (measured during the prior fuel injection cycle) and the predicted valve response angle VRA on which the lookup timing angle TA is based. After the TDC reference signal is generated, if the stroke timing is adjustable, the actual stroke reference angle SRA is measured as represented by steps 254, 256. As represented by adaptive step 258, the modified timing angle TA is then corrected to reflect any variation between the actual stroke reference angle SRA (measured) (or fixed reference angle (calibrated), if used,) and the predicted stroke reference angle SRA on which the lookup timing angle was based. As represented by step 260, the actual timing angle TA is then measured and compared with the corrected timing angle TA. During that measurement, as represented by step 262, the processor 82 compares the measured quantity angle QA with the lookup quantity angle QA, and when they are equal, the solenoid is de-energized. Thereafter, as represented by steps 260 and 264, when the measured timing angle TA equals the corrected lookup timing angle TA, the solenoid valve is re-energized. If the timing cam 14 is adjustable, the processor 82 then calculates the actual and desired cam positions and initiates adjustment of the cam 14 to achieve the desired position as in the flowchart of FIG. 10. In addition, as represented by step 268, the actual valve response angle VRA is determined by measuring the angle between actual valve energization and actual valve closure.

As will be apparent to persons skilled in the art, various modifications, adaptations and variations of the foregoing specific disclosure can be made without departing from the teachings of the present invention.

I claim:

1. In an internal combustion engine fuel injection system having a charge pump with reciprocating pumping means and operating cam means providing periodic intake and pumping strokes of the pumping means to periodically receive an intake charge of fuel and deliver fuel above a certain high pressure for injection of a charge of fuel, and regulating means for regulating the injection timing and quantity of each injected charge of fuel, the improvement wherein the regulating means comprises a bidirectional flow, electromagnetic valve having open and closed positions and which, in its open position, is operable to supply fuel to the charge pump during the intake stroke and to spill fuel from the charge pump during the pumping stroke, the valve having an electromagnet adapted to be energized and deenergized to open and close the valve, and control means actively governing the energization and deenergization of the valve electomagnet to regulate the intake charge quantity of fuel supplied to the charge pump and thereby regulate the fuel injection timing solely by selectively closing the valve during each intake stroke and to regulate the injected charge quantity solely by selectively opening the valve during each pumping stroke to spill fuel from the charge pump and thereby terminate said delivery of fuel.

2. A method of regulating the fuel injection timing and quantity of an internal combustion engine fuel injection system having a charge pump with reciprocating pumping means with periodic intake and pumping strokes to periodically receive an intake charge of fuel supplied at a first relatively low pressure and deliver fuel above a second relatively high pressure substantially higher than said first pressure for injectin of a charge of fuel, the method comprising the step of providing a bidirectional flow, electromagnetic valve having open and closed positions and which, in its open position, is operable to supply fuel to the charge pump during the intake stroke and to spill fuel from the charge pump during the pumping stroke and which has an electromagnet adapted to be energized and deenergized to open and close the valve, and the step of actively governing the energization and deenergization of the valve electromagnet to regulate the intake charge quantity of fuel supplied to the charge pump and thereby regulate the fuel injection timing solely by selectively closing the valve during each intake stroke and to regulate the injected charge quantity solely by selectively opening the valve during each pumping stroke to spill fuel from the charge pump and thereby terminate said delivery of fuel.

3. A method of regulating the fuel injection timing and quantity of an internal combustion engine fuel injection system having a charge pump with reciprocating pumping means and operating cam means for reciprocating the pumping means, the operating cam means having intake and pumping ramp means providing periodic intake and pumping strokes of the pumping means to periodically receive an intake charge of fuel supplied at relatively low pressure and deliver fuel at relatively high pressure for injection of a charge of fuel, the charge pump having a fixed charge pump stroke timing of reciprocation of said pumping means, the method comprising the step of providing a bidirectional flow, electromagnetic valve having open and closed positions and which, in its open position, is operable to supply fuel to the charge pump during the intake stroke and to spill fuel from the charge pump during the pumping stroke and which has an electromagnet adapted to be energized and deenergized to open and close the valve, and the step of actively governing the energization and deenergization of the valve electromagnet to regulate the intake charge quantity supplied to the charge pump during each intake stroke and thereby regulate the fuel injection timing, solely by precisely closing the valve during the intake stroke, and to regulate the injected charge quantity solely by regulating the termination of said high pressure delivery of fuel during each pumping stroke by precisely opening the valve during the pumping stroke.

4. A method of regulating the fuel injection timing and quantity of an internal combustion engine fuel injection system having a charge pump with reciprocating pumping means and operating cam means for reciprocating the pumping means, the operating cam means having intake and pumping ramp means providing periodic intake and pumping strokes of the pumping means to periodically receive an intake charge of fuel supplied at relatively low pressure and deliver fuel at relatively high pressure for injection of a charge of fuel, the charge pump having an adjustable charge pump stroke timing of reciprocation of said pumping means, the method comprising the step of providing a bidirectional flow, electromagnetic valve having open and closed positions and which, in its open position, is operable to supply fuel to the charge pump during the intake stroke and to spill fuel from the charge pump during the pumping stroke and which has an electromagnet adapted to be energized and deenergized to open and close the valve, the step of adjusting the charge pump stroke timing, and the step of actively governing the energization and deenergization of the valve electromagnet to regulate the intake charge quantity supplied to the charge pump during each intake stroke and thereby regulate the fuel injection timing, solely by precisely closing the valve during the intake stroke in accordance with the charge pump stroke timing and to regulate the injected charge quantity solely by regulating the termination of said high pressure delivery of fuel during each pumping stroke by precisely opening the valve during the pumping stroke in accordance with the fuel injection timing resulting from the charge pump stroke timing and the intake charge quantity supplied to the charge pump during the preceding intake stroke.

5. A fuel injection system according to claim 1 wherein the charge pump comprises charge pump stroke timing means adjustable for adjusting the charge pump stroke timing of the intake and pumping strokes of the pumping means and wherein the control means selectively adjusts the charge pump stroke timing means and selectively closes the valve during each intake stroke to regulate the intake charge quantity of fuel supplied to the charge pump and thereby regulate the injection timing in accordance with the charge pump stroke timing.

6. A fuel injection system according to claim 1 further comprising an auxiliary rotary inlet valve for automatically supplying fuel to the charge pump during only an initial part of each intake stroke before the closure of the electromagnetic valve by said control means.

7. A fuel injection system according to claim 1 wherein the electromagnetic valve is electromagnetically closed when energized and comprises an opening spring for opening the valve when deenergized.

8. A fuel injection system according to claim 1 wherein the control means comprises an injection timing sensor operable to generate an electrical, reference, injection timing signal and an electrical controller having a data processor connected for receiving the generated reference signals and connected for energizing and deenergizing the electromagnetic valve to precisely regulate the injection timing and quantity in accordance with the generated reference signals.

9. A fuel injection system according to claim 8 wherein the sensor is a start-of-pumping sensor.

10. A fuel injection system according to claim 1 wherein the control means comprises a stroke timing sensor operable to generate an electrical, reference, stroke timing signal and an electrical controller having a data processor connected for receiving the generated reference signals and connected for energizing and deenergizing the electromagnetic valve to precisely regulate the injection timing and quantity in accordance with the generated reference signals.

11. A fuel injection system according to claim 1 wherein the charge pump comprises a fuel passage between the electromagnetic valve and pumping means, an isolation shuttle mounted for reciprocation in the fuel passage to and from an extended limit position thereof, means biasing the isolation shuttle in one direction thereof to its extended limit position to supply fuel above a first pressure to the pumping means during its intake stroke, the pumping means being connected to hydraulically actuate the isolation shuttle in the opposite direction against said biasing means with fuel delivered by the pumping means during its pumping stroke, and one-way valve means for supplying fuel at a second pressure, less than said first pressure, to the pumping means during its intake stroke after the isolation shuttle reaches its extended limit position.

12. A fuel injection system according to claim 1 wherein the reciprocating pumping means comprises a rotor body having a plurality of radially extending bores and a reciprocating pumping plunger within each bore, the rotor body having an internal bidirectional flow passage connected to the pumping means, the electromagnetic valve having a bidirectional flow, valve member mounted within said internal passage of the rotor body and an electromagnet for operating said bidirectional flow, valve member to open and close the valve, said operating cam means being an annular cam surrounding the rotor body for reciprocating the pumping plungers as the rotor body rotates.

13. A fuel injection system according to claim 12 further comprising an auxiliary rotary inlet valve for automatically supplying fuel to the charge pump during only an initial part of each intake stroke before the closure of the electromagnetic valve by the control means, the auxiliary valve comprising a valve port in the rotor body connected to the pumping means, and a plurality of angularly spaced fuel supply ports with which the valve port registers in sequence to supply, during each such registration, fuel to the pumping means during said initial part of the intake stroke of the pumping means.

14. A fuel injection system according to claim 1, wherein the charge pump has a fixed charge pump stroke timing of the intake and pumping strokes of the pumping means and wherein the operating cam means comprises pumping ramp means, providing said periodic pumping strokes of the pumping means, with a generally constant effective slope.

15. A fuel injection system according to claim 5, wherein the operating cam means comprises pumping ramp means, providing said periodic pumping strokes of the pumping means, with a variable effective slope.

16. A fuel injection system according to claim 1 wherein the operating cam means comprises intake ramp means with a relatively shallow slope and wherein the control means regulates the intake charge quantity by stroke-time inlet metering.

17. A fuel injection system according to claim 1 wherein the operating cam means comprises intake ramp means with a relatively steep slope and wherein the control means regulates the intake charge quantity by pressure-time inlet metering.

18. A method of regulating the fuel injection timing and quantity according to claim 2, further comprising the step of regulating the charge pump stroke timing of the intake and pumping strokes of the pumping means.

19. A method of regulating the fuel injection timing and quantity according to claim 18, further comprising the step of generating a reference timing signal of the charge pump stroke timing and regulating the closure of the valve in accordance with the timing of the generated reference signals.

20. A method of regulating the fuel injection timing and quantity according to claim 2, further comprising the step of generating a reference timing signal of the injection timing and regulating the closure of the valve in accordance with the timing of generated reference signals.

21. A method of regulating the fuel injection timing and quantity according to claim 18, further comprising the step of generating a reference timing signal of the injection timing and regulating both the closure of the valve and the charge pump stroke timing in accordance with the timing of the generated reference signals.

22. A method of regulating the fuel injection timing and quantity according to claim 3, further comprising the step of generating a reference timing signal of the injection timing during each pumping stroke and wherein the intake charge quantity is regulated during each intake stroke in accordance with the timing of the generated reference signals.

23. A method of regulating the fuel injection timing and quantity according to claim 22, wherein the spill termination of said high pressure delivery of fuel is regulated during each pumping stroke in accordance with the timing of the generated reference signals.

24. A method of regulating the fuel injection timing and quantity according to claim 3, further comprising the step of generating a reference timing signal of the charge pump stroke timing and wherein the intake charge quantity is regulated during each intake stroke in accordance with the timing of the generated reference signals.

25. A method of regulating the fuel injection timing and quantity according to claim 4 wherein fuel is supplied to the charge pump during each intake stroke via said bidirectional flow, fuel valve and via an auxiliary fuel supply valve through which the fuel supply is automatically terminated prior to the precise closure of said bidirectional flow, fuel valve.

26. A fuel injection system according to claim 12, wherein the valve member is mounted within said internal passage of the rotor body for rotation with the rotor body and for axial movement between open and closed positions thereof and wherein the valve electromagnet comprises a fixed stator coil and an armature mounted in axial alignment with the valve member and axially shiftable by the stator coil to shift the valve member between its open and closed positions.

27. A fuel injection system according to claim 26 wherein the valve member is a poppet valve member having a peripheral annulus permitting bidirectional flow through the valve with the valve member in its open position.

28. A fuel injection system according to claim 26 wherein the armature engages an axial end face of the valve member to shift the valve member between its open and closed positions.

29. A fuel injection system according to claim 27 wherein the poppet valve member, in its closed position is hydraulically balanced with respect to the pressure of the fuel delivered by the pumping means.

30. A method of regulating fuel injection timing and quantity according to claim 2 wherein the charge pump has a rotary drive for effecting said reciprocation of the pumping means, wherein the step of actively governing the energization and deenergization of the valve electromagnet comprises periodically generating reference timing signals including at least one reference timing signal during each cycle of reciprocation of the pumping means, periodically electronically determining a desired injection timing angle of rotation of the rotary drive after a respective reference timing signal for closing the electromagnetic valve, periodically electronically determining a desired injection quantity angle of rotation of the rotary drive after a respective reference timing signal, measuring, during each cycle of reciprocation of the pumping means, the actual injection timing angle of rotation of the rotary drive after the respective reference timing signal and closing the valve when the actual injection timing angle equals the desired injection timing angle and measuring, during each cycle of reciprocation of the pumping means, the actual injection quantity angle of rotation of the rotary drive after the respective reference timing signal and opening the valve when the actual injection quantity angle equals the desired injection quantity angle.

31. A method of regulating fuel injection timing and quantity according to claim 30 wherein the reference timing signal generating step comprises generating a single reference timing signal during each cycle of reciprocation of the pumping means for regulating closing and opening the valve.

32. A method of regulating fuel injection timing and quantity according to claim 31 wherein the single reference timing signal is generated during each cycle of reciprocation of the pumping means at a fixed predetermined reference point.

33. A method of regulating fuel injection timing and quantity according to claim 30 wherein the reference timing signal generating step comprises generating, during each cycle of reciprocation of the pumping means, separate injection timing and injection quantity reference timing signals for regulating closing and opening the valve.

34. A method of regulating fuel injection timing and quantity according to claim 33 wherein the separate reference timing signals comprise an injection timing reference timing signal at a fixed prederemined reference point and an injectin quantity reference timing signal of the actual fuel injection timing.

* * * * *